SIGNALLING SYSTEM

Filed Dec. 9, 1959 4 Sheets-Sheet 1

INVENTOR.
Tore Hesselgren
BY
Michael S. Striker
Atty

INVENTOR.
Tore Hesselgren

BY

Michael S. Striker
Atty

INVENTOR.
Tore Hesselgren
BY
Michael J. Striker
Atty

INVENTOR.
Tore Hesselgren
BY
Michael S. Striker
Atty

United States Patent Office 3,128,350

Patented Apr. 7, 1964

3,128,350

SIGNALLING SYSTEM

Tore Hesselgren, Borensvagen 5, Johanneshov, Sweden

Filed Dec. 9, 1959, Ser. No. 858,449

Claims priority, application Sweden Apr. 14, 1959

9 Claims. (Cl. 179—90)

The present invention relates to an automatic signalling system for signal transmission over an automatic telephone network. The system according to the invention is particularly suitable for central supervision of a plurality of automatically operating systems or equipments which are located at separate places remote from each other. Thus, the signalling system according to the invention can be used to advantage for example for the supervision of a plurality of buildings to effect a signal transmission to the supervision station in the case of fire, burglary or stops and faults in machinery such as, for example, heating systems, located in the buildings.

The system according to the invention comprises a number of transmitters which are located at different places which are to be supervised, and a receiver located at a central supervision station. Each transmitter is connected to one or more detecting members which are adapted to be actuated in the case of any occurrence for which information is to be sent to the supervision station. The transmitter as well as the receiver is connected to an automatic telephone network over ordinary subscribers' lines.

When any of the detecting members is actuated the respective transmitter is made operative and connects itself to the telephone line and transmits a code signal (switching signal) corresponding to the number of a receiver. The transmitter is thereby connected by the automatic telephone exchange to the receiver and then transmits code signals indicating the identity of the transmitter and other code signals indicating the type of fault or other occurrence which initiated the signalling. Aforementioned signals are recorded at the receiver, for example, by an automatic writer on recorder and may also be utilized to actuate alarm devices.

The receiver is provided with means for transmitting return signals to the transmitter indicating the proper function of the receiver. In the transmitter are provided means which are actuated by these return signals and also means which are actuated by the return signal (dial tone) which is transmitted from the telephone exchange when this is prepared to receive switching signals from the calling transmitter. If one or more of these return signals should fail to arrive, the transmitter repeats the switching and transmitting sequence. If all return signals arrive at the transmitter indicating that the transmitter has been connected to the receiver and that the receiver has functioned correctly, the transmitter is made inoperative after completed transmission and effects the release of the connection to the receiver even if the detecting member which caused the signalling remains in its actuated state.

The system according to the invention may also be provided with a plurality of receivers, and the transmitters can be so designed that they connect themselves and signal to all the receivers in turn, or so that they connect themselves to a second receiver if a first receiver is busy or does not operate. Alternatively, the transmitters may be provided with manually operable means by which they can be pre-set so that when they are made operative they connect themselves to a certain receiver among a plurality of accessible receivers.

In order that the present invention may be readily carried into effect, it will now be described with reference to the accompanying drawings, wherein.

Figure 1:
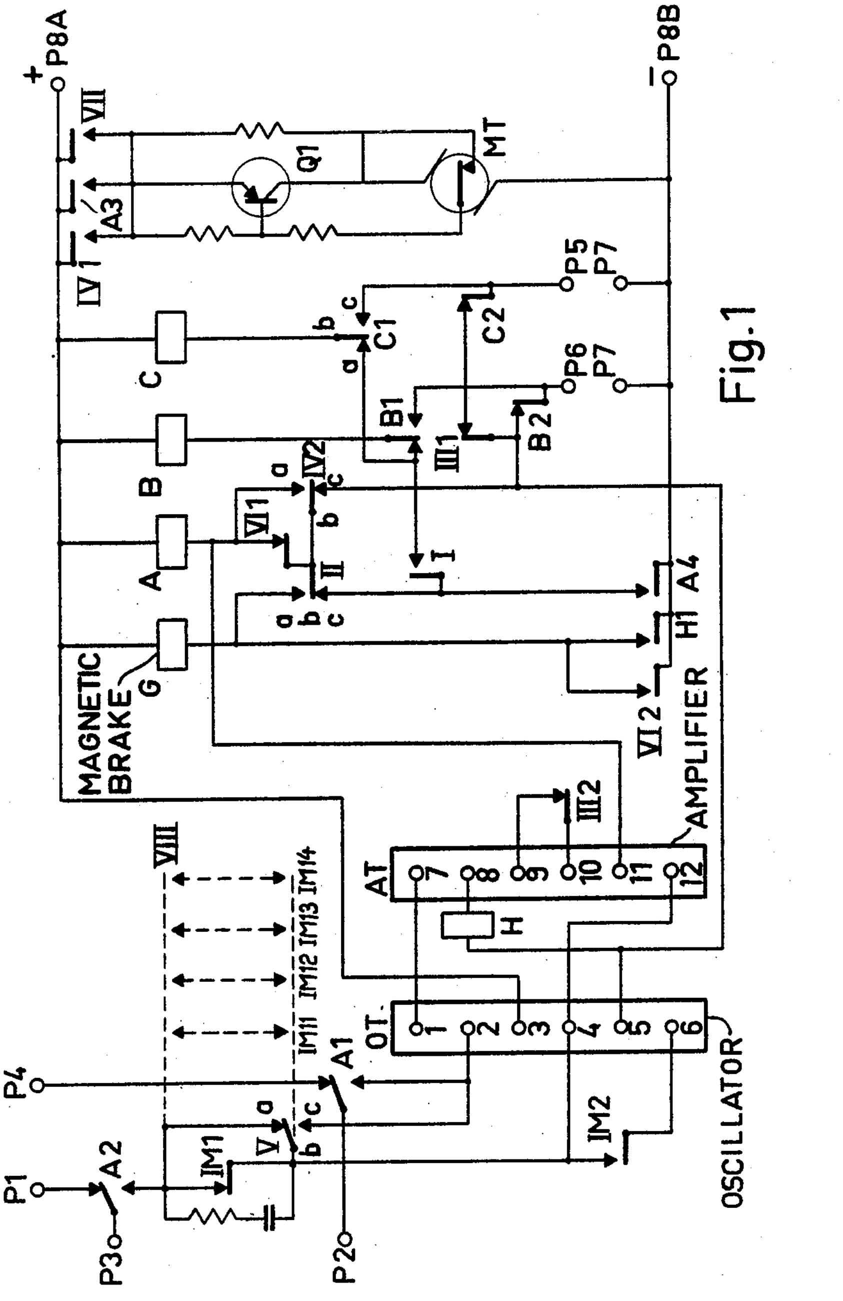
FIG. 1 is a schematic circuit diagram of an embodiment of a transmitter of the system of the present invention.

In FIG. 1, the transmitter is provided with two terminals P2 and P3 for connection to a telephone line. The terminals P1 and P4 are provided for connection to an ordinary subscriber's telephone set. The terminals P6—P7 and P5—P7 are intended to be connected to detecting members of known type. The detecting members may comprise, for example, contact thermometers, contact manometers, limit switches, thermostats, photocell devices and similar devices. The detecting members should be so arranged and connected that when actuated they establish an electric connection between the terminals P6 and P7, or P5 and P7 respectively. A direct current source with the polarity indicated in FIG. 1 is connected between terminals P8A and P8B.

The transmitter also comprises a number of relays A, B, C, and H and a motor MT. The motor MT drives a cam system with seven cams. The cams are not shown in FIG. 1; only the contacts operated thereby being shown. These contacts are designated by Roman numerals, and where several contacts are to be operated by the same cam they are designated by the same Roman numeral accompanied by different indices. The first five cams I to V, which are not shown in FIG. 1, are coupled to the motor by means of a gear and a friction clutch not shown in FIG. 1. A magnetic stop or brake device the control coil of which is designated G in FIG. 1, is provided for the first five cams. By means of the stop device G, the cams I–V can be retained although the motor MT is running, in which case the friction clutch slips. The stop device is so designed that it releases the first five cams I–V when the coil G is energized. The stop device is effective only at two positions of the cams I–V, so that if the motor MT is running and the stop device is released the cams I–V will rotate through a predetermined part of one revolution to the next stop position even if the current through the control coil G is interrupted during the rotation.

Figures 5, 6, 7:
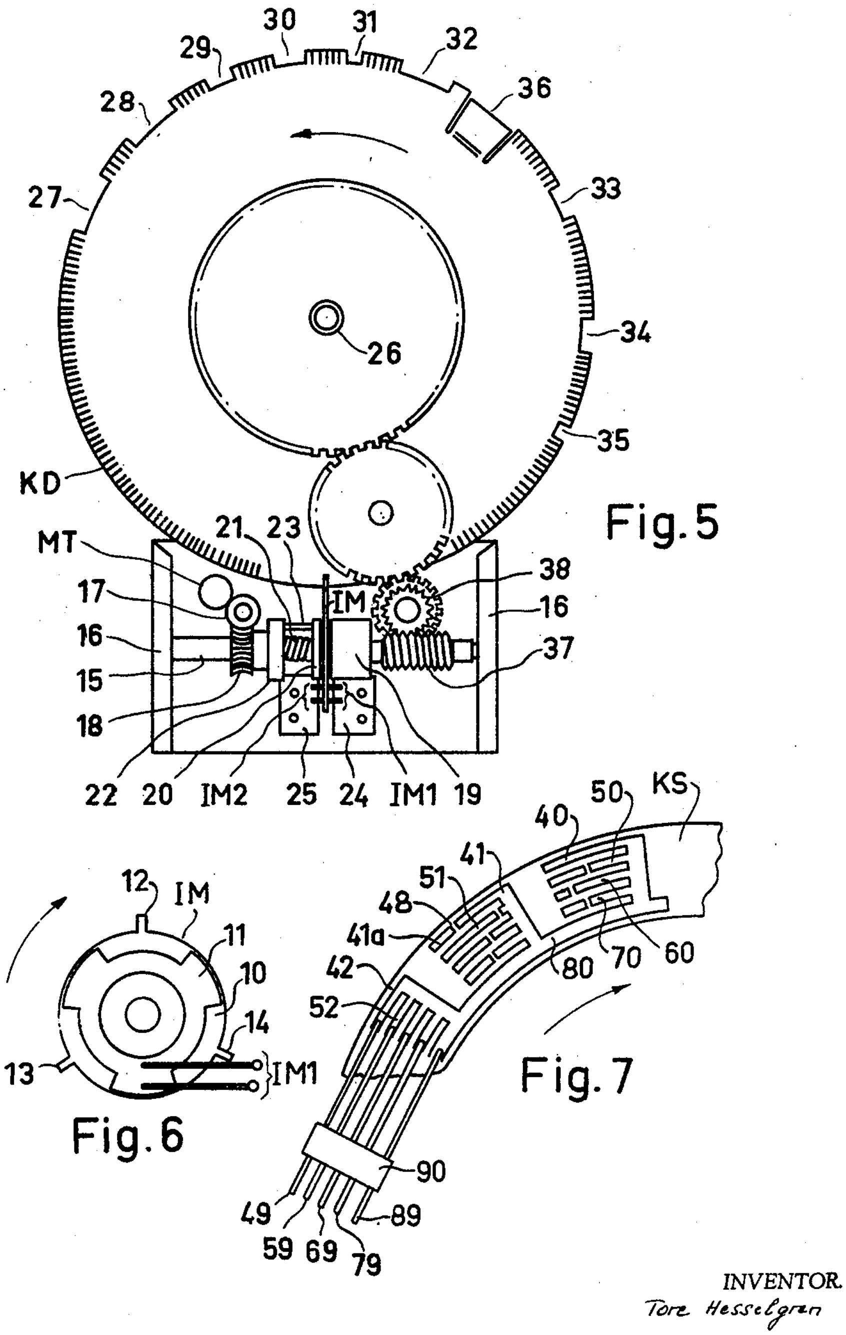
FIG. 5 is a view of an embodiment of pulsing device for a transmitter of the system of the present invention.
FIG. 6 is a detail view of a portion of the pulsing device of FIG. 5.
FIG. 7 is a detail of the pulsing device of FIG. 5.

The sixth and seventh cams VI and VII, which are not shown in FIG. 1, are coupled to the motor MT by means of gears, not shown in FIG. 1, and rotate as long as the motor is running. The gears between the motor and the respective cam sets I–V and VI–VII are preferably so designed that the cams I–V rotate at a somewhat higher speed than the cams VI–VII. The motor MT also drives a pulsing device which is not shown in FIG. 1, but is shown in FIG. 5. In FIG. 1 the contacts IM1 and IM2 are actuated by the pulsing device of FIG. 5. The pulsing device is described hereinafter in greater detail with reference to FIG. 5, but it should be noted now that a code disc KD, which is included in the pulsing device, is coupled to the first five cams I–V so that said code disc rotates with said cams.

The rotational speed of the motor MT is regulated by means of a transistor Q1 in combination with a control circuit of known type and a centrifugal contact controlled by the motor.

Figure 3:
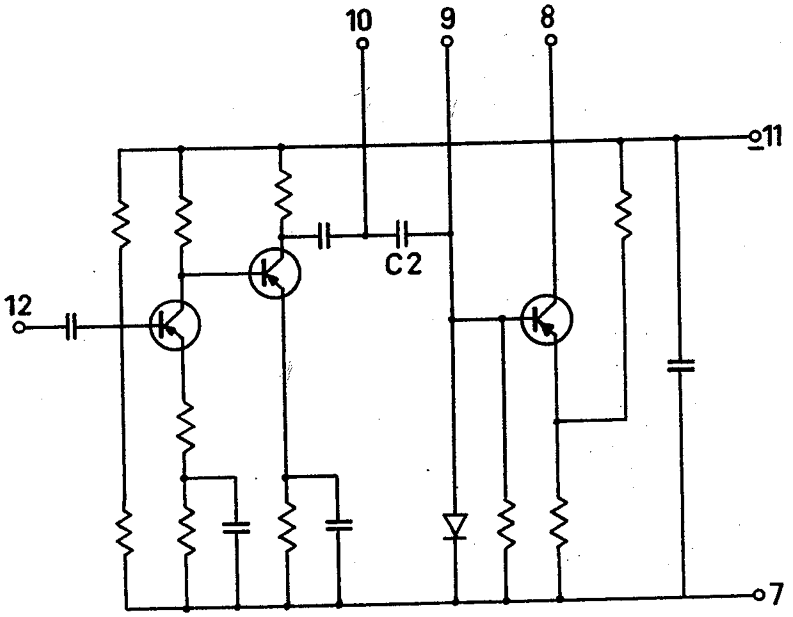
FIG. 3 is a schematic circuit diagram of an embodiment of an amplifier which may be utilized in the transmitters and the receivers of the system of the present invention.

The transmitter also includes an amplifier AT and an oscillator OT which are synthetically shown in FIG. 1 as blocks with numbered terminals. An embodiment of an amplifier which may be utilized as the amplifier AT is shown in detail in FIG. 3 and an embodiment of an oscillator which may be utilized as the oscillator OT is shown in detail in FIG. 4.

Figure 2:
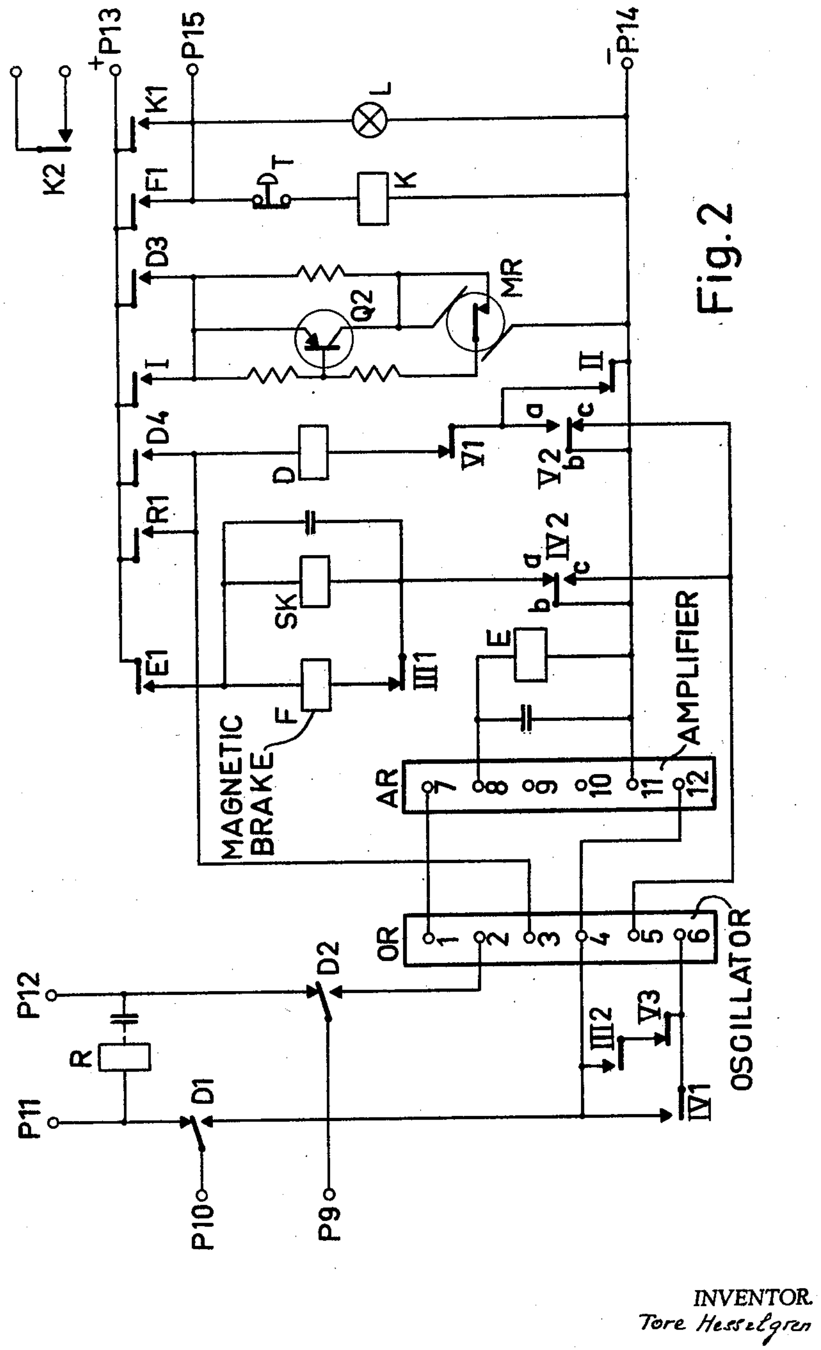
FIG. 2 is a schematic circuit diagram of an embodiment of a receiver, of the system of the present invention.

In FIG. 2, the receiver is provided with the connecting terminals P9 and P10 for connection to a telephone line. The terminals P11 and P12 are intended for connection to an ordinary subscriber's telephone set. A direct current source with a polarity indicated in FIG. 2 is connected between terminals P13 and P14. An alarm device or the like may be connected between terminals P15 and P14.

The receiver is provided with relays D, E, F, K and R. The contacts belonging to the relays are designated by the corresponding letter accompanied by a numeral. The receiver includes a motor MR with a speed control circuit comprising a transistor Q2 and a centrifugal contact actuated by the motor. The motor MR drives a cam system comprising five cams I–V. In FIG. 2, the cams are not shown and only the contacts operated by the five cams I–V are shown, said contact being designated in accordance with the same principle as is used for designating the cam operated contacts of FIG. 1. The cams I–III are coupled to the motor by means of a suitable gear, not shown in FIG. 2, so that they rotate as long as the motor is running. The fourth and fifth cams IV and V are driven by the motor with the same gear ratio as the other cams, are coupled to the motor by means of a friction clutch, not shown in FIG. 2, and are arranged to be actuated by a magnetic stop or brake device the control magnet of which is designated F in FIG. 2. The stop device F of FIG. 2 operates in the same manner as the stop device G of FIG. 1.

The receiver also includes an amplifier AR and an oscillator OR which are of the same design as the amplifier AT and the oscillator OT, respectively, of FIG. 1.

The receiver also includes a recording device which may comprise, for example, a tape recorder in which incoming signals are recorded in the form of markings on a tape of paper or other suitable material by means of a magnet or magnet head SK. However, the recording device may be of other type.

The operation of the system will now be described in detail.

Figure 4:
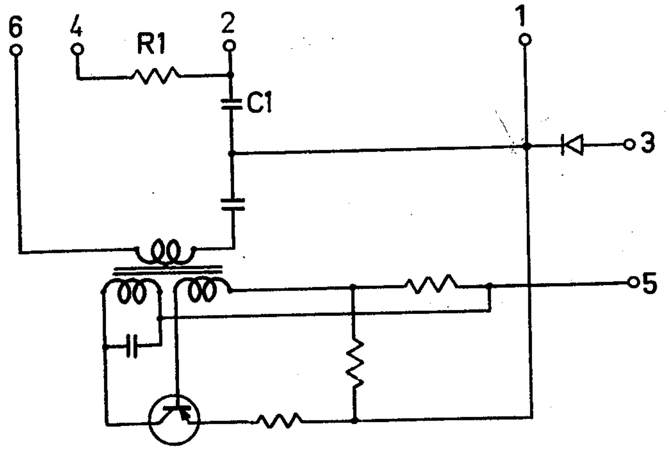
FIG. 4 is a schematic circuit diagram of an embodiment of an oscillator which may be utilized in the transmitters and the receivers of the system of the present invention.

It is assumed that a detecting member connected to terminals P5–P7 of the transmitter is actuated. An energizing circuit for the relay A is thereby closed from P8A through the winding of relay A, cam operated contact IV1, cam operated contact IV2*b–c*, cam operated contact III1, relay contact C2, and terminals P5–P7. Relay A is energized or made operative, and closes via its contact A4 a hold circut through contacts II*b–c* and VI1. Relay A closes via its contact A3 the supply circuit of the motor MT, which starts, and simultaneously cams VI and VII begin to rotate. One conductor P2 of the telephone line is connected by relay contact A1 to terminal 2 of oscillator OT. The other conductor P3 of the telephone line is connected over via pulse contact IM1 and relay contact A2 to terminal 4 of the oscillator OT. As shown in FIG. 4, a resistor R1 is connected between terminals 2 and 4. Resistor R1, which has a resistance of about 300 ohms, thus closes the line loop, and the automatic telephone exchange connected to the line then responds in the same manner as for an ordinary call.

Terminal 2 of oscillator OT is connected to terminal 1 by means of a capacitor C1 (FIG. 4), and terminal 1 is directly connected to terminal 7 of amplifier AT. Terminal 4 of the oscillator is connected to terminal 12 of the amplifier. The input of the amplifier is then connected to the telephone line. When dial tone arrives from the lines, the relay H, which is connected in the output circuit of the amplifier AT, is operated and closes a circuit for the stop magnet G via its contact H1. The first five cams I–V and the code disc KD are thereby released and begin to rotate.

The cam operated contact V is then moved to position *b–c* whereby the amplifier AT is disconnected from the line and the short-circuit of pulse contact IM1 is removed. The pulse contact IM1 then causes the transmission of pulses representing the number of a receiver in a manner which is described hereinafter in greater detail with reference to FIG. 5. A short time after the whole number has been transmitted the cams I–V and the code disc KD arrive at a position where the stop device can engage it and are stopped in this position because the magnetic brake G no longer is energized after the contact H1 is opened.

Under the control of the pulses received from the transmitter the telephone exchange then sets up the connection to the receiver in a known manner and transmits ringing signals. The ringing signals arrive at the receiver (FIG. 2) via terminals P9 and P10 and are applied to the relay R via a capacitor. Relay R is operated and closes by its contact R1 an energizing circuit for relay D through cam operated contacts V1 and II. A holding circuit for relay D is established via its contact D4. The contacts D1 and D2 at the relay D are changed over so that the terminal P9 is connected to the terminal 2 of the oscillator OR and the terminal P10 is connected to the terminal 4 of the oscillator OR and to the terminal 12 of the amplifier AR. Relay contact D3 closes a power supply circuit for the motor MR so that said motor starts and the cams I–III begin to rotate. Cam operated contact V3 is closed, and after about one second cam operated contact III2 is also closed, so that an audio frequency signal is transmitted from the oscillator via the telephone line to the transmitter. This signal, which may be called answering signal, is also supplied to the amplifier AR of the receiver and causes the operation of relay E. The contact E1 of the relay E closes its contact E1 which is included in an energizing circuit for the stop magnet and relay F. However, the cam operated contact III1 is then open and therefore the magnet F is not operated in response to said signal.

Before the cams I–V in the transmitter are stopped after completed digit pulsing, the cam operated contact V is restored to position *a–b* thereby connecting the amplifier AT to the line, and the cam operated contact III2 is opened so that the short-circuit of capacitor C2 (FIG. 3) in the amplifier is removed. The amplifier AT is thereby made insensitive to signals of the relatively low frequencies used for dial tone and busy tone. It is, however, still sensitive to the audio frequency (for example 1700 c./s.) answering signal transmitted by the receiver. When the answering signal arrives at the transmitter, the relay H is operated again and closes the energizing circuit for the magnetic brake G via the contact H1 so that the cams I–V and the code disc KD begin to rotate again. As is described hereinafter in greater detail with reference to FIG. 5, the code disc KD is so designed that it then causes the pulse contact IM2 to be closed for about half a second. During this time, an audio frequency signal is transmitted from the oscillator OT to the receiver.

In the receiver, the amplifier AR is then connected by its input terminals to the line and the cam operated contact III1 is closed. When the last mentioned audio frequency signal from the transmiter arrives, the magnetic brake F is energized via the relay contact E1, cam operated contact III1 and cam operated contact IV2 in position *a–b*. The cams IV and V are thereby released for rotation, and in addition a driving mechanism (not shown in the figures) for feeding the recording tape is started. The cam operated contact V2 is changed over into position *a–b* while contact V3 is opened. The stop magnet F, which also serves as a relay, closes, when it is energized, its contact F1 so that the relay K is energized and is locked via its contact K1. The indicating lamp L then receives current and is lighted, and current is also supplied to external alarm devices connected to the terminals P14—P15. The relay K can be released or deenergized only by the operation of a push button T.

A code signal consisting of groups of audio frequency pulses is then transmitted from the transmitter under the control of pulse contact IM2 and the code disc KD. In the receiver, the relay E is operated for each received pulse and actuates the recording magnet or magnetic head SK so that a marking is obtained on the recording tape for each received pulse.

The transmitter includes a cam operated contact III1 which is adapted to be opened during the specific time interval of the code signalling. The power supply circuit for the oscilaltor OT is thereby interrupted so that during this interval no pulses are transmitted to the receiver. This applies provided that the detecting member connected to the terminals P5—P7 released the signal transmission. If the detecting member connected to terminals P6—P7 had been operated, the said opening of the cam operated contact III1 would have been without any effect on the pulse transmission. Thus, the recording in the receiver becomes different according to which of the detecting members in the transmitter caused the signalling.

After the code signalling is completed, the cam operated contact IV1 in the receiver is closed and causes an audio frequency signal to be sent to the transmitter. This signal may be defined as a clearing signal.

At the time that the clearing signal is sent from the receiver, the cam operated contact II in the transmitter is changed over to position *a–b* and the holding circuit of the relay A is broken or opened. The clearing signal from the receiver, however, causes the operation of the relay H so that said relay closes another energizing circuit for the relay A via its contact H1 and remains in energized condition. The cam operated contact I is then closed and the relays B and C are energized via contact A4. Relay contact C2 then interrupts the energizing circuit for the relay H so that the relay H is deenergized and the energizing current for relay A is interrupted and the relay A is also deenergized. The relay C remains energized by means of a circuit via contact C1 in position *b–c* and the detecting member connected to the terminals P5—P7. The relay B, however, is deenergized or released again since no holding circuit for this relay is established unless there is a connection between the terminals P6—P7.

The cams of the transmitter continue to rotate until all of them have returned to their initial positions under the control of contacts IV1 and VII.

After the receiver has sent out the clearing signal, the relay D is deenergized or released because cam operated contact V1 is opened for a brief moment. The cams of the receiver are returned to starting position under the control of cam operated contact I.

If the condition which caused the signal transmission remains, so that there is still connection between the terminals P5 and P7 after the signalling is completed, this condition cannot cause the transmitter to be started again because the relay C is then energized or made operative and keeps contact C2 open. On the other hand, the transmitter can be started again if the detecting member connected to the terminals P6—P7 is actuated and provides a connection between said terminals.

If a dial tone does not arrive within about 10 seconds after the transmitter has been connected to the telephone line, the relay A is released due to the opening of cam operated contact VII. At the same time, the cam operated contact VI2 is closed so that the magnetic brake G is energized and releases the cams I–V. The cams are then returned to starting position by the motor under the control of the cam operated contacts. Then the operating sequence is started again.

If the receiver is busy when the digit signals have been transmitted and the connection set up, the transmitter does not receive any answering signal from the receiver. In that case, the relay A is released after some seconds by the opening of cam operated contact VI1 and at the same time the magnetic brake G is released by the closing of cam operated contact V12. The transmitter is then restored to starting condition, whereupon the operating sequence is repeated.

The said closing and opening functions of cam operated contacts VI1 and VI2 will of course be performed at predetermined times whether or not a dial tone or answering signal arrives. However, if these signals have arrived, the said contact functions will be without effect, since the cams I–V have been started whereby cam operated contact IV2 is changed over to position *a–b* so that the relay A still receives energizing current when cam operated contact VI1 is opened.

The pulsing mechanism of the transmitter is hereinafter described with reference to FIGS. 5 and 6.

The pulsing contacts IM1 and IM2 each consists of a pair of springs which are in contact with the sides of a rotatable disc IM called the pulsing disc. This consists of a circular plate 10 of insulating material which is provided on both sides with a coating of an electrically conductive material 11. As shown in FIG. 6, the coating 11 has such shape that during each revolution of the disc it causes three makes and three breaks between the contact springs of IM1 and IM2. The pulsing disc is loosely fitted on a shaft 15 which is journalled in supporting members 16 and is driven by motor MT of FIG. 1, not shown in FIG. 5, by means of a gear 17, 18. One side of the pulsing disc IM rests against a bushing 19 which is fixedly attached to the shaft 15. The disc IM is pressed against the bushing 19 by a washer 20 which is displaceable on the shaft 15 and is pressed against the pulsing disc IM by a spring 21 which at its other end rests against another bushing 22 which is fixedly attached to the shaft 15. A peg 23 is attached to the bushing 22 and extends into an aperture in the washer 20. The springs of the pulsing contacts IM1 and IM2 are secured to insulating plates 24 and 25, respectively.

The members 19 to 23 form a friction coupling between the shaft 15 and the pulsing disc IM whereby the pulsing disc can be stopped while the shaft 15 continues to rotate.

As shown in FIG. 6, the pulsing disk IM is provided with three radial projections 12, 13 and 14 disposed with equal angular spacing along the periphery of the circular plate 10. The projections 12, 13 and 14 serve as stop members and coact with code disc KD.

The code disc KD is mounted on a shaft 26 which is situated in the same plane as the pulsing disc IM and thus extends at right angles to said shaft 15 of the pulsing disc. The diameter of the code disc KD is so large that the peripheral part of it is situated in the path of movement of the projections 12, 13 and 14 of the pulsing disc IM. At certain places on its periphery the code disc KD is however provided with recesses 27 to 35 of such depth that they permit passage to the projections 12 to 14 of the pulsing disc IM.

The code disc KD is adapted to rotate with a speed which is in a predetermined relation to the speed of rotation of the shaft 15 of the pulsing disc IM. The code disc KD is, for example, driven from the shaft 15 by means of a worm gear 37, 38, the outgoing shaft of which is connected to the shaft 26 of the code disc by means of a gear and a friction clutch. The cams I–V (not shown in FIG. 5) are mounted on the same shaft 26 as the code disc and rotate together with said code disc as long as the motor MT is running and the cams are not retained by the magnetic brake G (FIG. 1).

The speed of rotation of the shaft 15 may be, for example, 200 revolutions per minute. When the pulsing disc IM rotates it will thus produce 10 pulses per second, which is a common pulsing rate in automatic telephone systems. The sections of the metal coating 11 on the pulsing disc IM are of such dimensions that the ratio of the break period to make period is 60:40. The speed of rotation of the code disc KD is 2.5 revolutions per minute. That is, the speed of rotation of the pulsing disc IM is 80 times greater than that of the code disc KD.

While the duration of each pulse is determined by the pulsing disc IM, the number of pulses in each pulse train and the number of pulse trains is determined by the size and number of the recesses in the code disc KD. The recesses 27 to 32 govern the digit pulsing while the recesses 33 to 35 govern the code pulses to be transmitted to the receiver.

The periphery of the code disc KD is provided with a bent-out portion 36 situated between the two groups of recesses 27 to 32 and 33 to 35. When any of the projections 12 to 14 of the pulsing disc IM rest against the bent-out portion 36, the pulsing contact IM2 is closed and causes the transmission of the audio frequency signal with a duration of about half a second, which follows after the transmitter has been connected to the receiver and has received the answering signal from the receiver. When projections 12 to 14 rest against other portions of the periphery of the code disc KD, the contact IM2 is open.

In manufatcure the code disc KD is provided along the greater portion of its periphery with narrow radial slits to a depth corresponding to the depth of the recesses to be provided in the disc and arranged with an angular spacing corresponding to the period for one pulse. The teeth formed between these slits can easily be broken away to produce recesses of desired length and position.

As hereinbefore mentioned, the transmitter may be provided in another embodiment with means for selectively calling a plurality of receivers. In that case, the recesses 27 to 32 of the code disc KD are made equal and of a length corresponding to ten pulses. Furthermore, in the other embodiment the code disc KD is combined with a special contact disc arranged to rotate together with the code disc. A part of such a contact disc KS is shown in FIG. 7. It is made of insulating material and on one side it is provided with a number of metal segments 40 to 42, 50 to 52, etc. The metal segments are arranged in concentric groups, one group being provided for each receiver number to be called. In the embodiment shown in FIG. 7, the number of such groups is four, and the number of segments within each group is the same as the number of digits in the receiver number. All the segments are connected with each other and with a common segment 80 in the manner shown in FIG. 7.

Each group of segments on the contact disc KS has a contact spring cooperating therewith. These contact springs, which are designated 49, 59, 69, 79 and 89, are mounted in an insulating supporting member 90 and form together with the respective cooperating contact segments the pulsing contacts which are indicated in FIG. 1 by dotted circuits and designated IM11, IM12, IM13 and IM14.

When the code disc KD rotates for digit pulse transmission, contact IM1 will produce ten makes and breaks for each digit in the number of the receiver. However, at the same time the contact disc KS rotates and the contact segments on said contact disc are so situated in relation to the recesses of the code disc KD that contact springs 49 to 79 are in contact with segments on the contact disc KS when the recesses in the code disc KD pass by the pulsinsg disc IM. Consequently, the pulsing contact IM1 will be short-circuited and ineffective during some part of each pulsing period.

The contact segments on the contact disc KS are provided with breaks located at some distance from the free end of the segment. Thus, for example, the segment 41 has a break 48. When, during the rotation of the contact disc KS, the break 48 has passed by the contact spring 49, so that said contact spring is in contact with segment part 41*a*, the said short-circuit of IM1 is removed, since the segment part 41*a* has no connection with the common segment 80. Thus, the desired number of pulses in each pulse train is produced by providing breaks in the contact segments on the contact disc KS at proper places. When the contact disc KS is manufactured the segments on it may be provided with slits extending over about half the width of each segment and situated with spacings corresponding to the interval for one pulse. A break in the segment can then easily be produced by means of a suitable tool at the correct place in order that the desired number of pulses shall be obtained.

For the selection of the different receiver numbers the transmitter may be provided with a cam operated switch VIII driven by means of a gear having a gear ratio of 1:4 from the cams I–V. If desired, the selection of the receiver number may be made dependent upon what detecting member releases the signalling. The arrangement may also be such that a transmitter is stopped after it has found a free receiver. The transmitter may also be provided with a manually operable switching device which may be set to cause the transmitter to call a certain receiver among a plurality of accessible receivers.

The code transmission may be effected in other ways than as aforementioned. Thus, for example, several frequencies may be used simultaneously. Other modifications are also possible within the scope of the invention.

While the invention has been described by means of specific examples and in specific embodiments, I do not wish to be limited thereto, for obvious modifications will occur to those skilled in the art without departing from the spirit and scope of the invention.

What is claimed is:

1. In a signalling system, a pulsing device comprising a first rotatable disc having contact segments on at least one side, a pair of fixed contact members coacting with said first disc, said contact members being so arranged in relation to said contact segments that on the rotation of the disc said contact segments periodically establish connection between said contact members, a second roatable disc situated in a plane substantially at right angles to the plane in which said first rotatable disc is situated, said first disc having at least one projection on its periphery, said second disc having its perphery located in the path of movement of said projection on the first disc, the periphery of the second disc having a number of recesses of a depth sufficient to allow the passage of said projection on the first disc, a shaft for said first disc, a friction coupling between said shaft and asid first disc, and driving means for driving the shaft of said first disc with a speed exceeding the speed of rotation of said second disc.

2. In a signalling system, a transmitter having terminals for connecting it to a telephone line, an audio frequency generator and a cyclically operating switching system, said switching system comprising a first rotatable disc having contact segments on each side, a first pair of contact members coacting with the contact segments on one side of said first disc, a second pair of contact members coacting with the contact segments on the other side of said first disc, said first disc having at least one radial projection, a second rotatable disc situated in a plane substantially at right angles to the plane of said first disc, said second disc having its periphery located in the path of movement of said radial projection on the first disc, the periphery of said second disc having a number of recesses of a depth sufficient to allow the passage of said projection on the first disc, a shaft for said first disc, a friction coupling between said shaft and said first disc, driving means for imparting rotation to the shaft of the first disc and to the second disc, gearing means for causing the speed of rotation of said shaft to be considerably larger than the speed of rotation of said second disc, contact means operated by said switching system for effectively connecting said first pair of contact members in series with said terminals during a first part of the operating cycle of the switching system and for connecting said second pair of contact members in series with said terminals and the output of said audio frequency generator during a second part of the operating cycle.

3. A signalling system as claimed in claim 2, in which said second rotatable disc has a bent-out portion at a part of its periphery, said second pair of contact members being so disposed in relation to the coacting contact segment on said first rotatable disc that said contact segment causes a connection between the contact members when said projection on the first disc bears against said bent-out portion of the periphery of the second rotatable disc.

4. In a signalling system, a pulsing device comprising a first rotatable disc having contact segments on at least one side, a pair of contact members bearing against said one side of the disc, said contact members being so disposed in relation to said contact segments that on the rotation of the disc the contact segments periodically establish connection between the contact members, said first disc having at least one radial projection on its periphery, a second rotatable disc situated in a plane substantially at right angles to the plane of said first disc, said second disc having its periphery located in the path of movement of said projection on the first disc, the periphery of said second disc having a number of recesses of equal length and of a depth sufficient to allow the passage of said projection on the first disc, a shaft for said first disc, a friction coupling between said shaft and the first disc, driving means for imparting rotation to said shaft of the first disc and to said second disc, gearing means for causing the speed of rotation of said shaft to be considerably greater than that of said second disc, a third rotatable disc connected with said driving means to be rotated thereby in synchronism with said second disc, said third rotatable disc carrying a plurality of contact segments arranged in a plurality of concentric groups, the segments of each group being disposed at equal radial distance from the axis of rotation of said third disc and in angular correspondence to said recesses in the periphery of the second disc, corresponding segments of all the groups of segments being connected to a common contact segment, separate contact members for engaging the separate groups of contact segments and a common contact member for engaging said common contact segment, each said separate contact member forming together with said common contact member a contact to be closed by the corresponding contact segments on said third disc, switching means for selectively connecting said contacts in parallel with said pair of contact members bearing against said first rotatable disc, the separate contact segments on said third disc having varying lengths to cause short-circuiting of said pair of contact members during predetermined time intervals of varying duration.

5. A pulse generator switching arrangement comprising, in combination, pulse duration control means comprising a first disc having electrically conductive contact segments on at least one side thereof and a projection extending from its periphery, and contact members connected in a circuit and positioned in operative proximity with the contact segments of said first disc so that upon rotation of said first disc said contact segments periodically provide electrical connection between said contact members to close said circuit;

pulse quantity control means comprising a second disc having a plurality of recesses in its periphery;

means positioning said first and second discs at substantially right angles to each other and in proximity to each other in a manner whereby the projection of said first disc is obstructed by said second disc in one condition and passes through the recesses of said second disc in another condition; and driving means for rotating said first and second discs, said contact segments being positioned on said first disc in a manner whereby said circuit is closed by said contact members during the time that the projection of said first disc is obstructed by said second disc and said circuit is alternately opened and closed by said contact members during the time that said projection passes through the recesses of said second disc.

6. A pulse generator switching arrangement comprising, in combination, pulse duration control means comprising a first disc having electrically conductive contact segments on at least one side thereof and a plurality of projections extending from its periphery, and contact members connected in a circuit and positioned in operative proximity with the contact segments of said first disc so that upon rotation of said first disc said contact segments periodically provide electrical connection between said contact members to close said circuit;

pulse quantity control means comprising a second disc having a plurality of recesses in its periphery, said recesses having predetermined peripheral lengths;

means positioning said first and second discs at substantially right angles to each other and in proximity to each other in a manner whereby the projections of said first disc are obstructed by said second disc in one condition and pass through the recesses of said second disc in another condition; and driving means for rotating said first and second discs, said contact segments being positioned on said first disc in a manner whereby said circuit is closed by said contact members during the time that the projections of said first disc are obstructed by said second disc and said circuit is alternately opened and closed during the time that said projections pass through the recesses of said second disc.

7. A pulse generator switching arrangement comprising, in combination, pulse duration control means comprising a first disc having electrically conductive contact segments on at least one side thereof and a plurality of radially extending projections on its periphery, and contact members connected in a circuit and positioned in operative proximity with the contact segments of said first disc so that upon rotation of said first disc said contact segments periodically provide electrical connection between said contact members to close said circuit;

pulse quantity control means comprising a second disc having a plurality of radially extending recesses of uniform radial length and predetermined peripheral lengths;

means positioned said first and second discs at substantially right angles to each other and in proximity to each other in a manner whereby the projections of said first disc are obstructed by said second disc in one condition and pass through the recesses of said second disc in another condition; and driving means for rotating said first and second discs, said contact segments being positioned on said first disc in a manner whereby said circuit is closed by said contact members during the time that the projections of said first disc are obstructed by said second disc and said circuit is alternately opened and closed during the time that said projections pass through the recesses of said second disc.

8. A pulse generator switching arrangement comprising, in combination, pulse duration control means comprising a first disc having electrically conductive contact segments on at least one side thereof and a plurality of radially extending projections on its periphery, and contact members connected in a circuit and positioned in operative proximity with the contact segments of said first disc so that upon rotation of said first disc said contact segments periodically provide electrical connection between said contact members to close said circuit;

pulse quantity control means comprising a second disc having a plurality of radially extending recesses of uniform radial length and predetermined peripheral lengths;

means positioning said first and second discs at substantially right angles to each other and in proximity to each other in a manner whereby the projections of said first disc are obstructed by said second disc in one condition and pass through the recesses of said second disc in another condition; and driving means for frictionally rotating said first disc in a manner whereby the operative condition of said driving means is unaffected by the rotating condition of said first disc and for driving said second disc, said contact segments being positioned on said first disc in a manner whereby said circuit is closed by said contact members when the projections of said first disc are obstructed by said second disc to prevent rotation of said first disc and said circuit is alternately opened and closed when said projections pass through the recesses of said second disc in unobstructed rotation of said first disc.

9. A pulse generator switching arrangement comprising, in combination, pulse duration control means comprising a first disc having electrically conductive contact segments on both sides thereof and a plurality of projections extending from its periphery, first contact members connected in a first circuit and positioned in operative proximity with the contact segments of one side of said first disc so that upon rotation of said first disc the contact segments of said one side periodically provide electrical connection between said first contact members to close said first circuit, and second contact members connected in a second circuit and positioned in operative proximity with the contact segments of the other side of said first disc so that upon rotation of said first disc the contact segments of said other side periodically provide electrical connection between said second contact members to close said second circuit;

pulse quantity control means comprising a second disc having a plurality of recesses and a bent area in its periphery;

means positioning said first and second discs at substantially right angles to each other and in proximity to each other in a manner whereby the projections of said first disc are obstructed by said second disc in a first condition, are obstructed by the bent area of said second disc in a second condition, and pass through the recesses of said second disc in a third condition; and driving means for rotating said first and second discs, said contact segments being positioned on the sides of said first disc in a manner whereby said first circuit is closed by said first contact members during the time that the projections of said first disc are obstructed by said second disc, said second circuit is closed by said second contact members during the time that the projections of said first disc are obstructed by the bent area of said second disc, and said first circuit is alternately opened and closed by said first contact members during the time that said projections pass through the recesses of said second disc.

References Cited in the file of this patent

UNITED STATES PATENTS

| | | |
|---|---|---|
| 2,036,037 | Goff | Mar. 31, 1936 |
| 2,280,604 | Richard | Apr. 21, 1942 |
| 2,329,466 | Goff | Sept. 14, 1943 |
| 2,729,707 | McKellen | Jan. 3, 1956 |
| 2,831,061 | Schmidt | Apr. 15, 1958 |